Patented Dec. 18, 1934

1,984,837

UNITED STATES PATENT OFFICE 1,984,837

MEASURING APPARATUS FOR ROLLED MATERIAL

Rudolf Kronenberg, Haus Kronenberg, Germany

Application August 27, 1929, Serial No. 388,831
In Germany June 10, 1929

1 Claim. (Cl. 33—147)

The invention relates to a measuring device which enables deviations in the thickness of an article from the required thickness to be determined, and in consequence of the special construction of the device it is particularly suitable for making even the smallest deviations clearly visible. Besides the measuring of articles of any kind, the device is particularly suitable for measuring and checking rolled material of any kind. The particular advantage of the device consists in the fact that it enables a measurement to be effected not merely from time to time, but during the whole of the rolling operation, and makes any deviations from the required thickness visible.

The device works by an indirect measuring process, that is to say, it is adjusted to zero by a measuring sheet which corresponds to the thickness to be rolled, and then indicates, while the strip is running through, its deviations from this normal dimension. The person supervising the rolling sees on a scale the extent of the deviations magnified one hundred fold or even more, and is in a position to maintain the prescribed allowance without difficulty by adjusting the spindles of the rolling mill nearer together or farther apart.

The material to be measured is placed between two rollers, one of which is eccentrically journalled, so that it can easily be rocked away from time to time, to facilitate the introduction of the material to be measured, by actuating a crank or a hand wheel, so as to produce a larger gap between the two rollers, whereupon, after introducing the material to be measured, this roller is rocked back and the original normal position is reestablished in a reliable manner. The second roll is so supported in the frame part of the apparatus as to be displaceable perpendicularly to the axis, being at the same time pressed firmly against the material to be measured by spring pressure. The changes in the thickness of the material to be measured as compared with the normal thickness to which the device is initially adjusted are now transmitted by the second roll to the indicating device, with the interposition of suitable transmission means, this second roll being pressed back, against the pressure of the spring, by the material to be measured.

The adjusting of the device to the desired normal dimension is effected by suitably positioning the first roll while the second roll merely has to transmit the deviations from the adjusted normal dimension to the indicating device.

Since the magnitude of the transmission ratio, and consequently the ratio of the deflections of the pointer, are limited by the space available, and on the other hand the convenience of the reading should not be impaired by excessively high accuracy such as is only occasionally required, a second and shorter pointer may according to the invention be fitted to the same device, which is influenced by the main pointer, and, by virtue of a further high transmission ratio, permits in its turn of greater accuracy in the reading as compared with the first pointer.

Finally the indicating device may also be connected with a recording device, which makes a permanent record of the deviation measured. The recording stylus is secured to a pivotally supported lever, which is moved from the pointer by means of a positioning screw. The stylus then describes the deviations measured upon a paper strip moving past it, with a definite ratio of magnification. Here again there is the possibility that the stylus may reproduce the deflection of the large pointer on an enlarged scale. The strip of paper bears a mean zero line, and beside it an allowance line at the correct distance. Furthermore guides are provided which hold the strip of paper fast at the sides, in order that the reciprocating movements of the stylus may not displace the paper. After the passage of the rolled strip the paper bearing the record is cut off underneath the guide and attached as a check strip to the material measured.

The invention is illustrated by way of example in the accompanying drawings in which.

Figure 1:
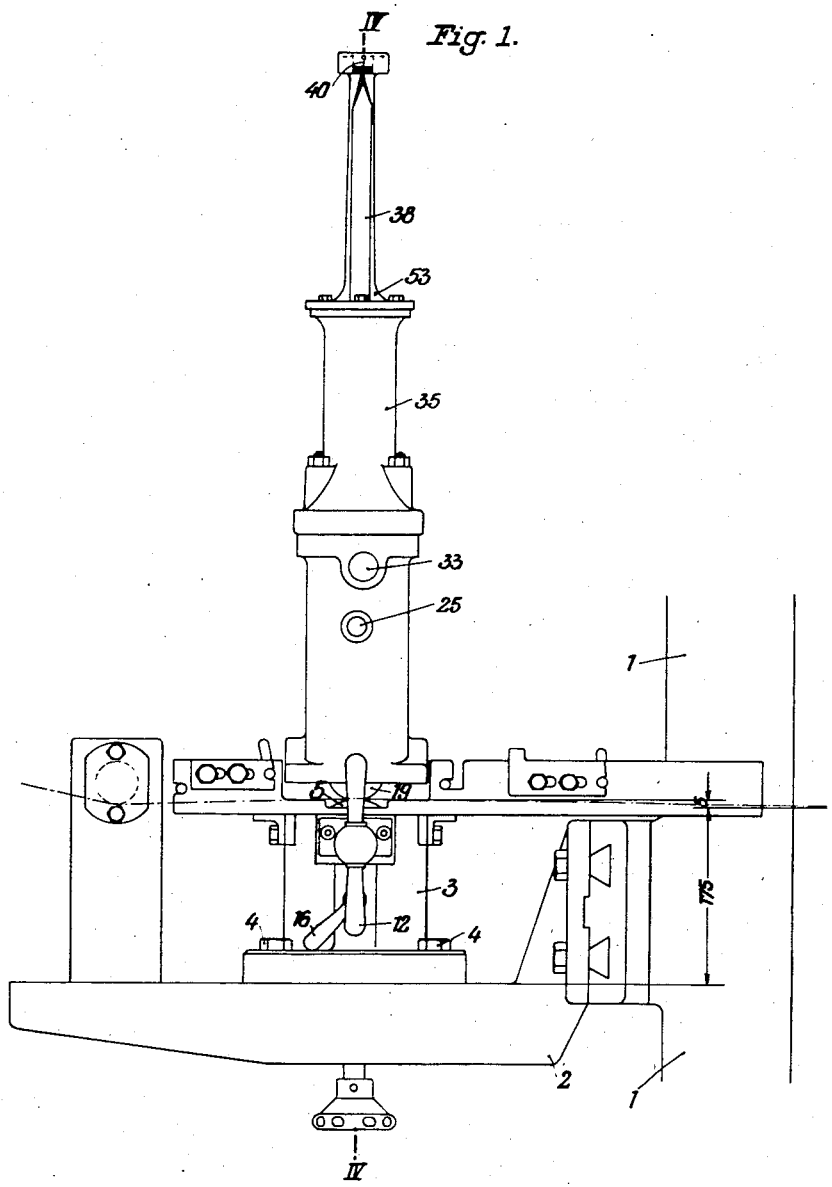
Figure 1 shows a front elevation of the measuring device.
Figure 2:
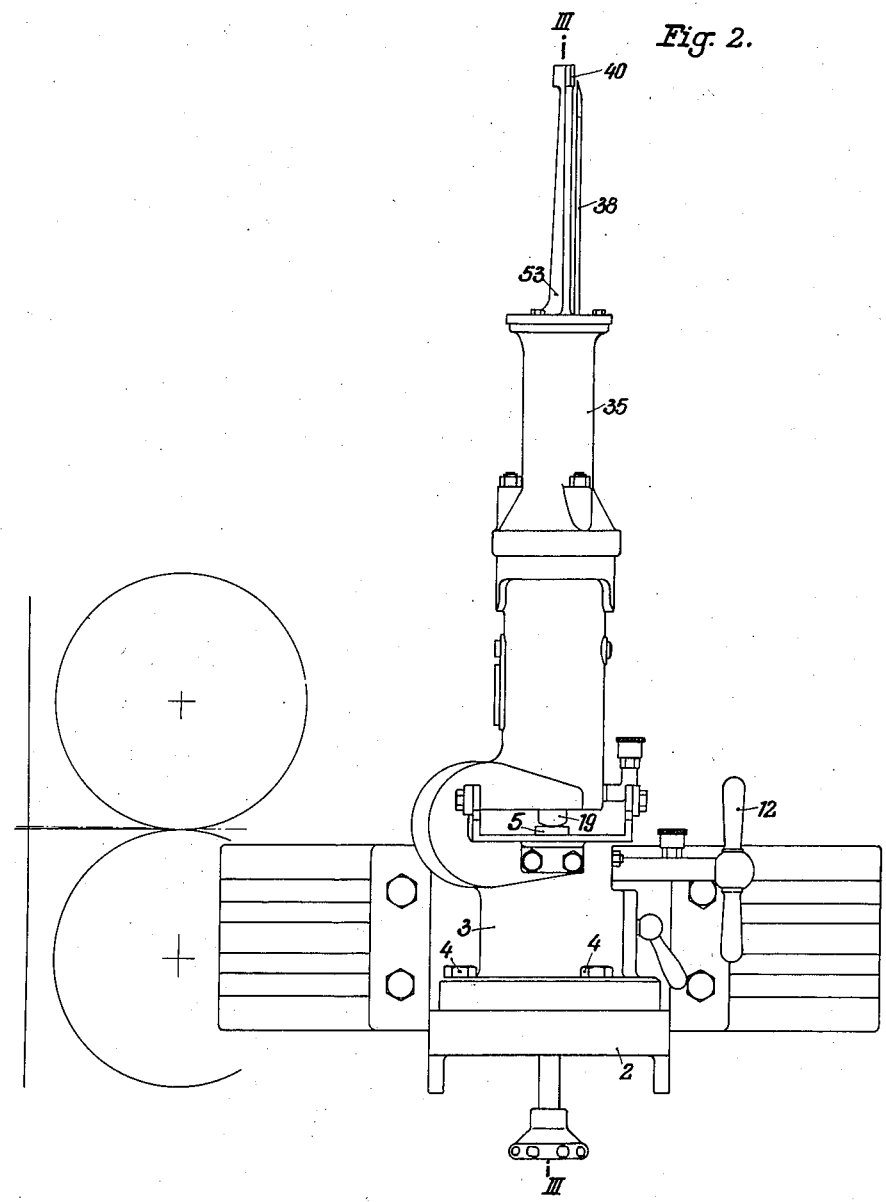
Figure 2 is a side elevation of the device shown in Figure 1.

The device as a whole is secured in any convenient manner to the standard 1 of the roll housing, a supporting member 2 being preferably provided, to which the under portion of a casing 3 is secured by means of screws 4. In the casing is arranged first of all a carrying roller 5 which is journalled in a bearing member 6, which is movable perpendicularly to the axis of the roll. The roll 5 is mounted upon a shaft 7 having an eccentric central portion in such a way that by rotating the shaft 7 through 180° the roll 5 can be raised or lowered by the amount of its eccentricity. 8 is a stop pin which is fitted to the shaft and which, in the upper and lower end positions of the roll 5, bears against corresponding stops 9, which are secured by a screw 11 to a cross plate 10, rigidly connected with the member 6. The rotating of the eccentric shaft 7 is effected by means of a hand wheel or a handle 12.

In order to adjust the device to the desired normal dimension the member 6, in which the roll 5 and therefore the eccentric shaft 7 are supported, is moved up and down inside the casing 3, the fine adjustment being effected by means of a screw threaded bolt 13, which is operated by a hand wheel 14, and is supported in a bearing member 15. After the member 6 has been adjusted, this member 6 is clamped by means of a screw 17, provided with a handle 16, for the purpose of guarding against subsequent shifting in consequence of vibration or the like. A pressure plate 18 is preferably also interposed between the pressure screw 17 and the member 6.

Figure 3:
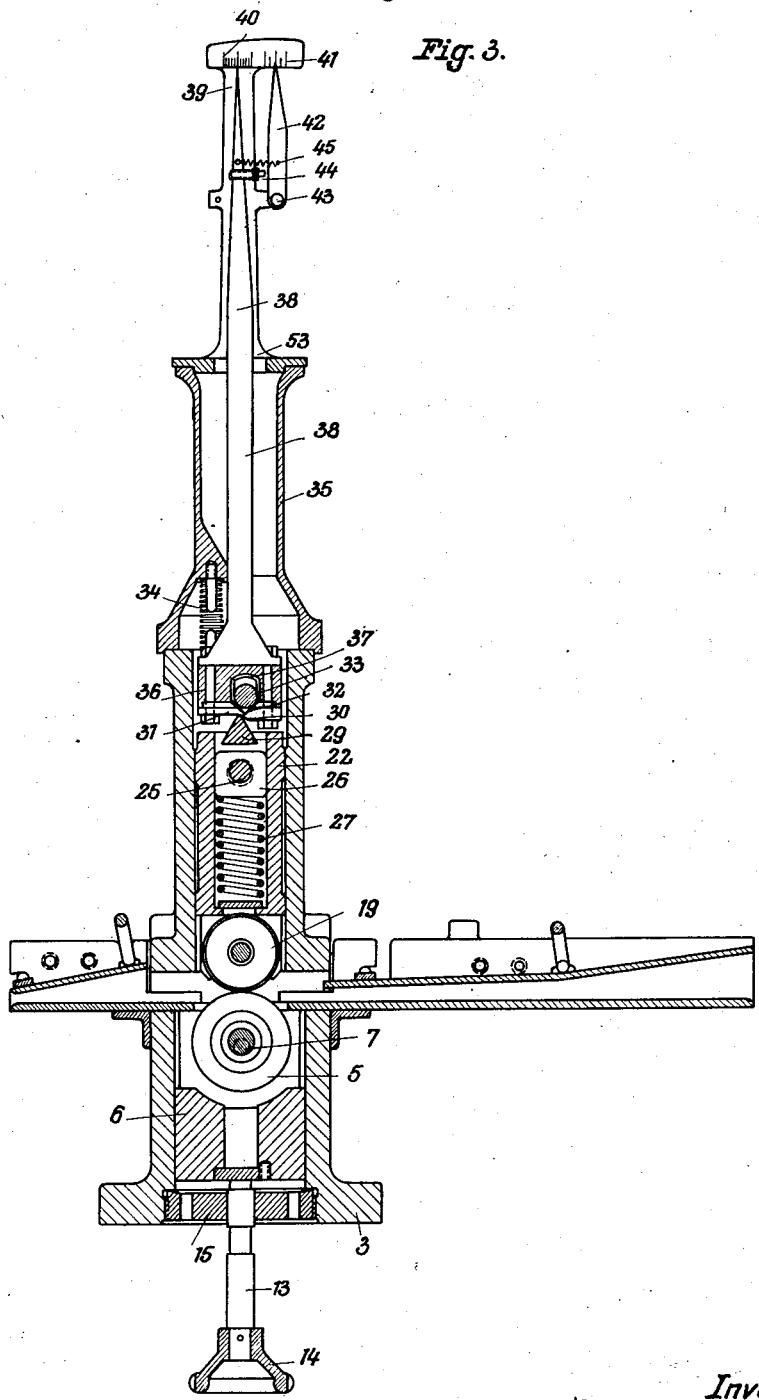
Figure 3 is a section on the line III—III in Figure 2.
Figure 4:
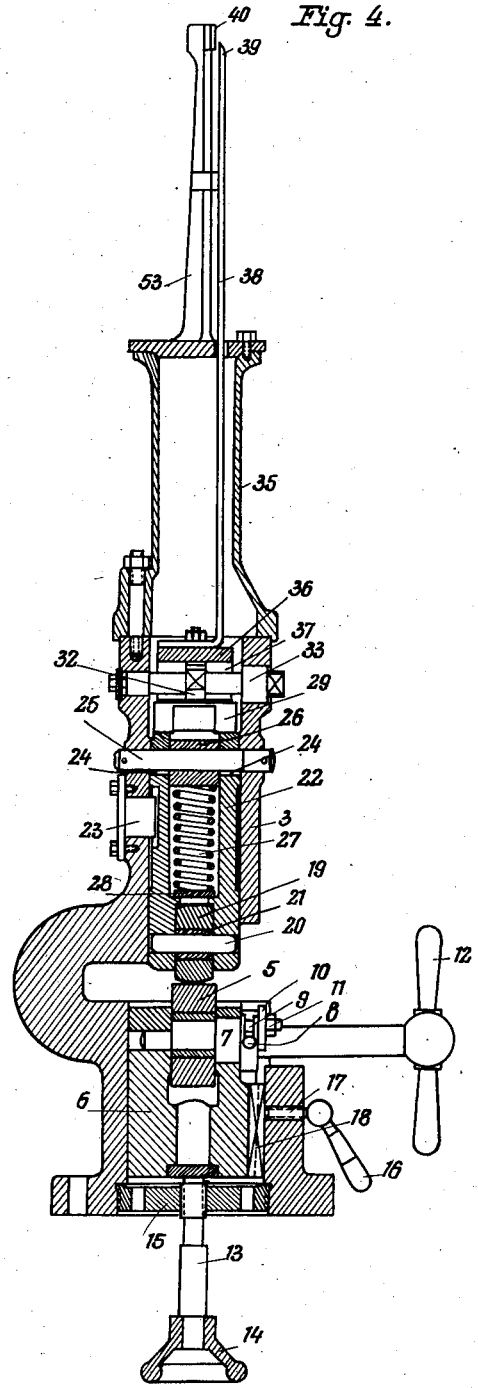
Figure 4 is a section on the line IV—IV in Figure 1.

The second or upper roll 19 is supported by means of a pivot 20 and a sleeve 21 in a cylindrical sliding body 22, which is fitted into the upper part of the casing 3 in such a manner as to slide easily therein, and is secured against rotation in the axial direction by a key 23. The body 22 has at opposite positions two longitudinal slots 24 through which projects a bolt 25, which is fixedly supported in the casing 3. Inside the body 22 there is mounted upon this bolt a pressure member 26, which serves as a bearing surface for a spring 27, which presses with its lower end upon a closure plate 28, and thereby tends to press the body 22 downwards. By means of the longitudinal slots 24 the necessary vertical movability is given to the body 22. Upon the cylindrical body 22 is mounted a member 29, which is provided with knife edges 30, upon which is mounted the lever beam 31, for the supporting of which there serves at one end a shaft 33 provided with a knife edge 32, and at the other end a pressure spring 34, which bears at one end against the upper portion 35 of the casing and at the other end against the member 36 rigidly connected with the beam. The shaft 33 has in the centre a thickened portion, which, on the side facing the beam 31, is provided with a knife edge 32, so that the movement of this transmission lever may take place as easily as possible. The member 36 has a corresponding recess 37 so that the oscillating movement of the member 36 is not hindered by the thickening of the shaft 33. To the member 36 is fitted a pointer 38, the tip 39 of which moves in front of a scale 40, upon which the varying deflections corresponding to the deviations from the standard thickness can be read off. The scale 40 is suitably mounted on the support 53 extending from the upper end of the casing 35. As will be seen from Figures 1 and 3, the extremities of the knife edges 32 and 30 are arranged one above the other but are somewhat out of alignment, so that by the movement of the body 22 a rocking movement of the beam 31 is produced, and therefore a deflection of the pointer 38.

In order that there may be the possibility, besides taking readings from the scale 40, of also effecting readings of greater accuracy in special cases there is provided besides the scale 40 another scale 41, in front of which moves a second pointer 42. This pointer 42 has its pivot at 43, at a comparatively short distance from the scale. In the immediate neighborhood of the pivot 43 there acts a bolt 44, which is secured in the pointer 38 and transmits the movement of the pointer 38 to the pointer 42. The bolt 44 is adjustable in its axial direction by means of a screw thread in the pointer 38, so that the two pointers can be adjusted to the corresponding zero points. The pointer 42 is held constantly against the bolt 44 by a spring 45. In this manner the deflection of the pointer 38 is transmitted through the medium of the new transmission ratio with a corresponding magnification to the pointer 42, so that the associated deflection of the pointer 42 is correspondingly greater, and permits of a greater accuracy of testing.

What I claim is:

A measuring device for sheet material comprising a casing having a vertical bore in its upper part and a vertical guideway in its lower part alined with the bore, said bore and guideway being separated by a horizontal work-receiving recess in the casing, a bearing block mounted in the guideway, a lower roller journaled in the bearing and projecting at its periphery into the work-receiving recess, a tubular member vertically slidable in the casing bore, an upper roller journaled in the lower part of the tubular member to project its periphery into the work-receiving recess to coact with the lower roller, a bearing member in the upper part of the tubular member and fixed to the casing, a spring in the tubular member compressed between the lower part of the tubular member and the bearing member and normally tending to press said tubular member downward to press the upper roller against the material carried by the lower roller so that variations in the thickness of the material cause a corresponding movement of the tubular member in the casing bore against the action of the spring, and indicating means actuated by the movement of the tubular member in the casing bore.

RUDOLF KRONENBERG.